May 6, 1969 S. W. ING, JR., ET AL 3,443,140

LIGHT EMITTING SEMICONDUCTOR DEVICES OF IMPROVED TRANSMISSION CHARACTERISTICS

Filed April 6, 1965

INVENTORS:
SAMUEL W. ING, JR.
HAROLD A. JENSEN,
BY Marvin D. Goldenberg
THEIR ATTORNEY.

United States Patent Office 3,443,140
Patented May 6, 1969

3,443,140

LIGHT EMITTING SEMICONDUCTOR DEVICES OF IMPROVED TRANSMISSION CHARACTERISTICS

Samuel W. Ing, Jr., Webster, and Harold A. Jensen, Liverpool, N.Y., assignors to General Electric Company, a corporation of New York Filed Apr. 6, 1965, Ser. No. 445,953
Int. Cl. H05b 33/02, 33/12
U.S. Cl. 313—108 5 Claims

ABSTRACT OF THE DISCLOSURE

Light emitting diode constructed integral with a semiconductor body that is geometrically shaped to efficiently transmit emitted light with substantial directionality. In one embodiment the body is shaped as a hemispheroid surrounded by a reflective paraboloid, with the diode formed at the center of curvature of the hemispheroid. In another embodiment the body is shaped as a truncated paraboloid having a planar front surface, the diode being formed at the focal point of the paraboloid.

The invention relates to light emitting semiconductor devices, and more particularly to novel light emitting devices of this type which have integrally related therewith, modified surface configurations and constructions for enhancing the intensity and directionality of the transmitted light.

A common form of light emitting semiconductor devices are p-n junction semiconductor diodes. When formed from certain compositions such as gallium arsenide (GaAs), gallium phosphide (GaP) or mixtures thereof, and biased in the forward direction, these devices have been shown to be extremely efficient light emitters. However, while efficiently generated at the junction, the light is not readily useful in basic devices because it is essentially nondirectional, and, in addition, is subject to repeated internal reflection and appreciable absorption within the semiconductor material. The internal reflection, is due to the high refractive index of the semiconductor material relative to that of the air or gas medium normally surrounding, through which transmission is required.

The geometry of the devices as initially fabricated use a thin, flat semiconductor body at one surface of which the junction is formed. The light transmitted from the diode is, in essence, only that passing through the opposing planar surface which is contained within a cone of 25° to 35° solid angle. The remainder of the light is incident at the surface at greater than the critical angle and this is internally reflected and absorbed. Thus, these diodes are found to provide a maximum useful light output of only about 2% of the total emitted light.

In one scheme that has been proposed for enhancing the light transmission efficiency, the geometry of the device is altered so that the semiconductor body is shaped in the form of a hemisphere, with the p-n junction formed at approximately the center of curvature. Light radiated from the junction strikes the interface of the semiconductor body and the surrounding medium approximately normal thereto, so that the major portion of the incident light is transmitted through the interface. The principal limitation with respect to the described configuration is that the light transmitted from the diode is hemispherically distributed and therefore lacks a directional characteristic, which is important for most contemplated uses, e.g., wherein the light emitting devices are employed in combination with compatible light sensing devices.

The present invention seeks to overcome the above noted limitation, and provide further improvement in the construction of light emitting semiconductor devices.

Accordingly, it is a prime object of the present invention to provide novel light emitting semiconductor devices of simple construction which transmit light of improved intensity and directional characteristics.

It is a further object of the present invention to provide novel light emitting p-n junction diode devices and the like wherein the forward and lateral surfaces of the semiconductor body associated with the light emitting junction are shaped so as to provide light transmission of improved intensity and directional characteristics.

It is a further object of the present invention to provide novel light emitting junction diode devices as above described which can be readily constructed from a single piece of semiconductor material.

In one exemplary embodiment of the invention, these and other objects are accomplished with respect to a light emitting junction diode device by appropriately shaping that part of the surface of the semiconductor body that is adjacent the light emitting junction. The surface is shaped in the form of a hemispheroid contained within a cavity, the sides of which surround the hemispheroid and provide a reflective surface segment for light incident thereon. The junction is preferably located at about the center of the hemispheroid base plane so that a high percentage of the emitted light strikes the hemispheroid surface approximately normal thereto and is therefore efficiently transmitted through the interface between the hemispheroid and the surrounding medium. A major portion of the light transmitted through the hemispherical surface is reflected by the surrounding surface segment so as to generate a light beam having substantial directional characteristics. In its preferred form for enhancing the directionality of the transmitted light, the reflective surface is shaped as a paraboloid section, with the light emitting junction located in the vicinity of the focal point. In addition, this surface can be coated with a reflective material for enhancing its reflectivity.

In a further light emitting junction diode embodiment of the invention, the semiconductor body is provided with a planar front surface which is across from the light emitting junction that is located in proximity with the back surface. The lateral surface of the body is disposed at an oblique angle with said planar front surface so as to provide a generally increasing perimeter along its extension from the back surface of the body to the planar front surface, whereby light rays emitted from the junction are incident at the oblique surface at an angle exceeding the critical angle for obtaining an internal reflection, and upon being reflected strike the front planar surface at an agle approximately normal thereto. Thus, the emitted light is transmitted through the front surface with a relatively high degree of efficiency and with substantial directional characteristics. In a preferred configuration of this embodiment the lateral surface is shaped as a paraboloid section, with the junction being located in the vicinity of the focal point for enhancing the directionality of the transmitted light.

While the specification concludes with claims which set forth the invention with particularity, it is believed that the invention, both as to its organization and method of operation, will be better understood from the following description taken in connection with the accompanying drawings in which:

Figure 1A:
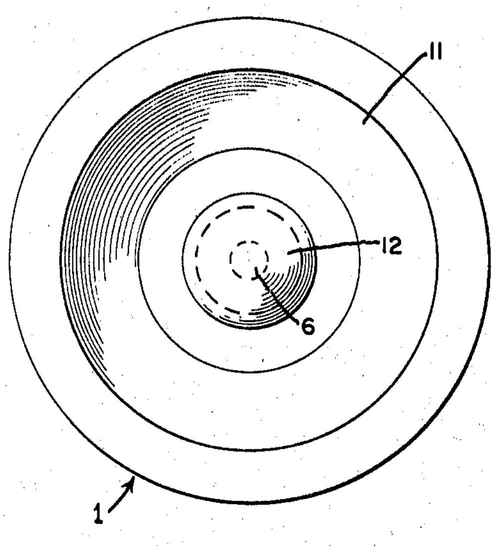
FIGURE 1A is a plan view of one embodiment of the invention wherein the front surface of the light emitting semiconductor device is shaped in the form of a hemispheroid having a surrounding reflective surface for enhancing the intensity and directionality of the transmitted light.
Figure 1B:
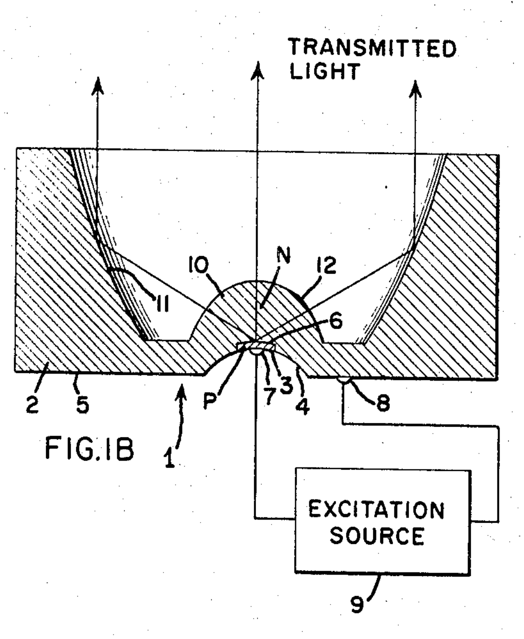
FIGURE 1B is a cross sectional view of the device of FIGURE 1A.

With reference now to FIGURES 1A and 1B, there is illustrated a light emitting junction diode 1 the front surface of which is shaped for accomplishing light transmission that is both relatively efficient and of good directional characteristics. The diode 1 includes a body 2 of semiconductor material doped so as to be an n-type region. A desirable semiconductor material is gallium arsenide (GaAs), which may have a typical dopant of tin for producing the n-type region. Other semiconductor material such as gallium phosphide (GaP), mixed crystals of GaAs and GaP and others known to the art can also be employed.

A p-type region 3 is formed at a notch 4 cut in the back surface 5 of the semiconductor body 2, thereby providing a p-n junction 6 which is of restricted dimensions. The p-type region may be formed by conventional techniques, typicaly being zinc diffused into the body 2 through a small opening in a mask, not shown, that is coated on the back surface 5. The mask is commonly formed by depositing silicon oxide or magnesium oxide onto the surface. A first ohmic contact 7 is made to the p-type region, and a second ohmic contact 8 is made on the back surface to the n-type region. A conventional source of excitation 9 is connected to contacts 7 and 8. Because of the small thickness dimension in the central region of the body 2, it is desirable that the ohmic contacts be closely spaced so as to provide a reasonably short path of conduction through the body, thereby avoiding the occurrence of excessive heating of the diode.

In light emitting junction diodes currently made, the junction is normally formed with the bulk of the material being the n-type region, since for commonly used semiconductor materials the n-type region has an appreciably lower light absorption coefficient than does the p-type region. However, for materials wherein the p-type region may exhibit a relatively low absorption, the junction can as well be formed with the bulk of the material being p-type.

The front surface of the body 2 is partially shaped in the form of a hemispheroid 10. Surrounding the hemispheroid 10 is a reflective surface 11 of inverted curvature with respect to the hemispherical surface 12. The reflective surface 11 is typically shaped as a paraboloid section, as illustrated, with the junction located in the vicinity of the focal point. It should be pointed out, however, that the curvature of the reflecting surface 11 need not be thus limited and may take a number of different shapes which will provide a directional characteristic to the transmitted light, as will be further explained.

The hemispheroid 10 and the paraboloid section 11 are in approximate coaxial arrangement with respect to the p-n junction 6. The notch 4 that is cut in the back surface 5 allows the junction 6 to be located at approximately the base plane of the hemispheroid 10 and in the vicinity of its center of curvature for providing optimum light transmission through the hemispherical surface 12.

The surface 11 of the semiconductor material may be coated with a reflecting substance, such as by evaporating a thin film of silver of gold thereon, for increasing its reflective efficiency. In addition, the hemispherical surface 12 may be coated with a suitable anti-reflective dielectric film for improving its efficiency of light transmission.

The front surface of the diode 1 is provided with the described configuration by conventional machining techniques well known to the art. For example, the unshaped semiconductor chip is mounted onto a rotating shaft and a tool of appropriate configuration, fixedly mounted, is brought down upon the front surface for grinding out the shaped cavity in a first rough cut. Suitable finishing steps using finer and softer cutting and polishing surfaces are subsequently employed for completing the shaping process. For most applications, it is not necessary that the surfaces be optically smooth. Since the noted shaping techniques are conventional, they need not be further described.

In the operation of the device 1, the light rays emitted from the p-n junction 6 tend to travel in all directions. However, the rays that would normally be transmitted in the backward direction are absorbed almost completely in the p-type region so that most of the emitted light rays are directed through the n-type region and towards the hemispherical surface 12. In the optimum configuration, the light rays are directed along radial paths so as to be incident at the surface 12 normal thereto, thereby being efficiently transmitted through the interface. For the semiconductor materials under consideration having a refractive index of about 3.5, light of zero degree incidence is transmitted through the interface with about a seventy percent efficiency without an anti-reflective coating on the surface 12, which can be increased to about ninety percent with such coating. Since, in practice the p-n junction cannot be made to be precisely a point source, some of the light rays will be incident at the surface 12 at angles other than normal, and the transmission efficiency and directionality is to this extent impaired.

The major portion of the light transmitted through the hemispherical surface 12 strikes the reflective surface 11 and is reflected thereby in a generally forward direction, as indicated by the arrow in FIGURE 1B. In the illustrated configuration, this is about seventy percent of the transmitted light. If the surface segment 11 is in the form of a paraboloid of good optical quality, with the p-n junction 6 located to a close approximation at its focal point, the light reflected from the surface 11 will have a high degree of collimation. For most present day applications, however, highly collimated light is not required, and light having merely reasonably good directional properties is normally sufficient. This is true where it is desired to couple the transmitted light to reasonably closely arranged light responsive devices that are sensitive to considerably less light intensity than may be transmitted. Thus, the reflective surface 11 may, in practice, assume any surface configuration which will provide a forward directional characteristic to the light transmitted through the hemispherical surface 12, including spherical or conical sections.

That portion of the light transmitted through the hemispherical surface 12 contained within a cone having its axis of rotation approximately normal to the base plane of the hemispheroid 10 (about thirty percent of the transmitted light in the illustrated construction) will not be intercepted by the reflective surface 11, and is not therefore provided with an added directional characteristic. However, because it is restricted to a cone that is generally in the direction of the reflected light, it may also provide a useful contribution to the overall light output. It may be appreciated that the solid angle of the cone in which the unreflected light is contained can be reduced by lengthening the dimension of the surface 11 in the forward direction.

Typical dimensions of the device 1 are as follows: thickness of the body 2, 40 mils; maximum diameter of the paraboloid 11, 50 mils; diameter of the hemispheroid 10, 15 mils; diameter of the p-n junction 6, 3 mils. These dimensions are merely exemplary and should not be construed as limiting.

For many applications it is desirable to fabricate the device to provide the smallest possible dimensions consistent with the light output power that may be required. This is particularly true where an array of such devices as illustrated in FIGURE 1 is fabricated, as from a single body of semiconductor material. However, a number of conflicting requirements exist which must be considered in determining the dimensions most desirable for a given application. For example, if the p-n junction is extremely small relative to the hemispherical curvature, it will appear as a point source and the light rays emitted therefrom will be most nearly incident at the optimum angle at the hemispherical surface 12. This can be attempted either by reducing the size of the junction or by increasing the size of the hemispheroid. However, it may be recognized there is a lower limit for the dimension of the p-n junction in order to generate a given light energy. Further, the hemispheroid 10 cannot be made extremely large and not introduce excessive light absorption. Normally, a compromise is effected between these conflicting constraints. As a further consideration, the thickness dimension of the body 2 is a limiting factor in determining the percentage of transmitted light that may be collimated by the reflective surface, as discussed previously in the context of lengthening the surface 11 in the forward direction. Thus, a trade-off is made in this respect. It should also be noted that sufficient thickness must exist between the base plane of the hemispheroid and the plane of the back surface 5 so that the heat conduction property of the semiconductor body 2 is adequate.

Figure 2A:
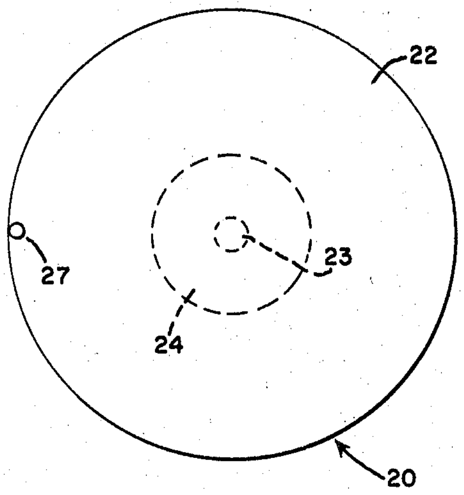
FIGURE 2A is a second embodiment of the invention wherein the front surface of the device is planar and the lateral surface is shaped so as to provide an internal reflection of the emitted light, whereby the light is directed through the front surface with high efficiency and directionality.
Figure 2B:
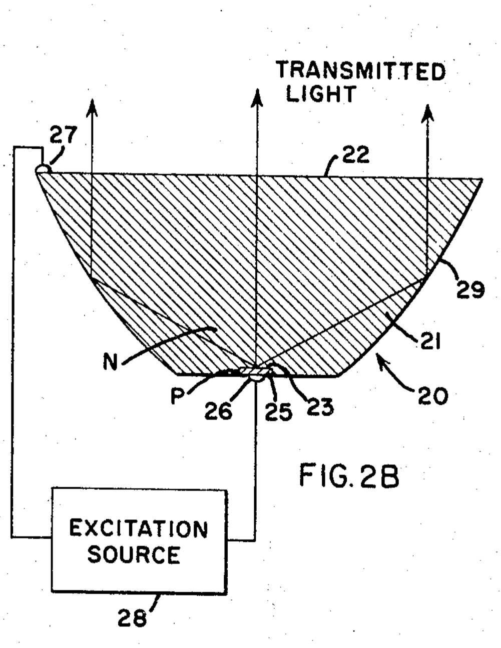
FIGURE 2B is a cross sectional view of the device of FIGURE 2A.

Referring now to FIGURES 2A and 2B, there is illustrated a second embodiment of a light emitting junction diode 20 wherein the semiconductor body 21 is shaped so as to provide an internal reflection of a major portion of the emitted light for enhancing the light transmission efficiency and directionality. The semiconductor body 21 may be composed of material similar to that previously considered with respect to the device of FIGURE 1, and is normally an n-type region. The device 20 includes a planar front surface 22 which opposes the light emitting p-n junction 23 formed on the back surface 24 of the device. The p-n junction 23 extends between the p-type region 25 and the n-type region of the semiconductor body. The p-type region may be formed in the same manner as previously described. A first ohmic contact 26 is made to the p-type region, and a second ohmic contact 27 is made to the n-type region, being conveniently made at the edge of the front surface. A source of electrical excitation 28 is connected to contacts 26 and 27.

The lateral surface 29 of the semiconductor body 21 is shaped so as to be oblique with respect to the front surface and the light emitting p-n junction 23. The angle of obliquity is such that a major portion of the emitted light from the p-n junction 23 is totally internally reflected by the lateral surface 29 and incident at the front surface 22 at an angle approximately normal thereto. In the configuration illustrated, the minimum angle of incidence at the lateral surface is about forty-five degrees, which is appreciably greater than the critical angle of the semiconductor material employed. The lateral surface 29 may be shaped by well known machining methods previously referred to.

With the curved surface 29 in the form of a truncated paraboloid and the p-n junction 23 located in the vicinity of its focal point, an appreciable collimation of the emitted light may be effected, about seventy percent of the emitted light in the illustrated configuration. As with respect to FIGURE 1, by lengthening the surface 29 in the forward direction, that portion of the light contained within a cone which is not intercepted by the surface is reduced, thereby further enhancing the directional properties of the transmitted light. Again, it should be pointed out that for many applications, highly collimated light is not required. Therefore, numerous surface configurations for the lateral surface of the device which, by means of internal reflection, direct an appreciable percentage of the emitted light towards the front surface so as to be transmitted therethrough with relatively good efficiency may be useful. Such configurations would include, but not exclusively, conical and spherical sections.

Although the invention has been described with respect to specific exemplary embodiments for the purpose of complete disclosure, it may be appreciated that numerous modifications may occur to those skilled in the art which fall within the present teaching.

The disclosed semiconductor devices can be fabricated from a single crystal, which has unique advantage in obtaining optimum light outputs and providing simplicity of fabrication. However, the construction need not be so limited and, other than the immediate light emitting portion, the body can be of another, separate structure that is closely joined to the light emitting structure. The separate structure can be a polycrystalline material that may or may not be a semiconductor, or the structure could be amorphous. If a different material is employed it should have a refractive index closely matched to that of the junction material and provide an interface of good optical properties with the light emitting structure.

The appended claims are intended to embrace all such modifications falling within the true scope of the invention.

We claim:

1. A light emitting semiconductor device comprising:
(a) a solid body of crystal semiconductor material of relatively high refractive index with respect to its surrounding medium, said body having a geometrically shaped front surface and a back surface,
(b) a semiconductor element including at least two regions of different conductivity types with a junction therebetween formed within said body in proximity with said back surface,
(c) a part of said front surface across said light emitting element being shaped to form a hemispheroid contained within a cavity the sides of which provide a reflective surface segment for light incident thereon, whereby light emitted from said element is transmitted through said hemispheroid and its interface with the surrounding medium, a major portion of the transmitted light being reflected by said reflective surface segment so as to provide a light beam of substantial directional characteristics.

2. A light emitting semiconductor device as in claim 1 wherein said cavity sides are coated with a reflective material.

3. A light emitting semiconductor device as in claim 1 wherein said back surface has a cut-out (in the vicinity where said junction is formed so as to locate said junction approximately in the hemispheroid base plane) extending to approximately the base plane of the hemispheroid, said junction being formed adjacent to said cut-out in the vicinity of the center of curvature of the hemispheroid.

4. A light emitting semiconductor device as in claim 3 wherein said reflective surface segment is approximately a paraboloid section with said junction being at about the focal point thereof.

5. A light emitting device as in claim 4 wherein said semiconductor material is gallium arsenide.

References Cited

UNITED STATES PATENTS

| | | | |
|---|---|---|---|
| 2,861,165 | 11/1958 | Algrain et al. | 219—34 |
| 3,111,587 | 11/1963 | Rocard | 250—199 |
| 3,283,207 | 11/1966 | Klein | 315—326 |
| 3,290,539 | 12/1966 | Lamorte | 313—114 |
| 3,304,430 | 2/1967 | Biard et al. | 250—17 |

OTHER REFERENCES

IBM Technical Disclosure, vol. 5, No. 12, May 1963, p. 67, J. E. Thomas, Jr., "Shadow-Free Transistor."

EDN, January 1965, pp. 73–84, 87, Optoelectronics Today, Sandlin, W. C.

Proceedings of IRE, vol. 51, January 1963, pp. 218–219, High Speed Heterojunction Photo-diodes and Beam-of-Light Transistors.

JOHN W. HUCKERT, *Primary Examiner.*

J. R. SHEWMAKER, *Assistant Examiner.*

U.S. Cl. X.R.

317—234